United States Patent Office 3,585,248
Patented June 15, 1971

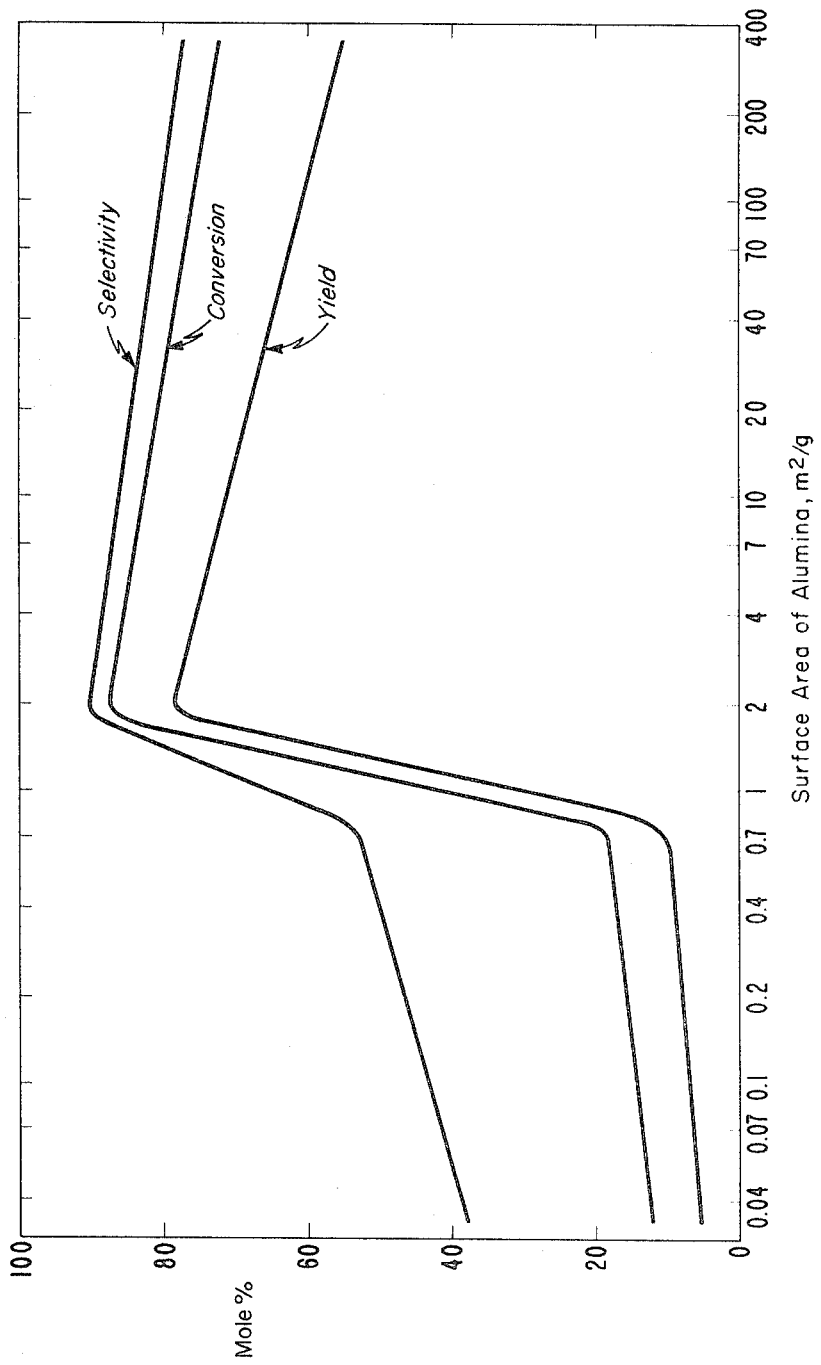

3,585,248
SULFUR OXIDE DEHYDROGENATION OF ORGANIC COMPOUNDS
Israel S. Pasternak, Noel J. Gaspar, Abraham D. Cohen, and Mohan Vadekar, Sarnia, Ontario, Canada, assignors to Esso Research and Engineering Company
Filed Dec. 2, 1968, Ser. No. 780,528
Int. Cl. C07c *15/10, 5/20*
U.S. Cl. 260—669
26 Claims

ABSTRACT OF THE DISCLOSURE

Organic compounds having a dehydrogenatable carbon to carbon bond are dehydrogenated in a vapor phase reaction by contact with a sulfur oxide over a low surface area catalyst. Yields of the dehydrogenated, i.e., more unsaturated, product and/or catalyst life can be increased by utilizing a catalyst containing minor amounts of an alkali or alkaline earth metal.

FIELD OF THE INVENTION

This invention relates to a process for the vapor phase dehydrogenation of organic compounds. More particularly, this invention relates to a process for effecting the dehydrogenation of dehydrogenatable compounds, i.e., compounds having at least one

—CH—CH— grouping, wherein adjacent carbon atoms are bonded to each other and have at least one hydrogen atom attached to each carbon atom, by contacting such compounds with sulfur oxides, i.e., $SO_2$ or $SO_3$ or water solutions thereof, at elevated temperatures and in the presence of a low surface area catalyst. Further, the reaction is generally conducted in the presence of an inert diluent in order to lower the partial pressure of the reactants. In a preferred embodiment hereof, catalyst life is greatly extended by utilizing a low surface area catalyst in conjunction with a minor amount of an alkali or alkaline earth metal.

PRIOR ART

The catalytic, vapor phase dehydrogenation of organic compounds to produce unsaturated or more highly unsaturated products than the feed in the presence of sulfur dioxide has long been known to the art, for example, see U.S. Pat. 2,126,817. Generally, the over-all reaction for the sulfur dioxide dehydrogenation of a hydrocarbon feed is in accordance with the following generalized expression:

$$3C_nH_{2n+2}+SO_2 \rightarrow 3C_nH_{2n}+H_2S+2H_2O \quad (1)$$

which shows that one-third mole of sulfur dioxide is theoretically required to dehydrogenate one mole of feed. While many processes have been reported, the commercial development of a sulfur dioxide process has been rather permanently delayed due to serious problems involving catalyst life. Thus, it is believed that, while dehydrogenation is the principal reaction occurring, a portion of the feed stock is being simultaneously degraded to form coke. This coke is formed at the surface of the catalyst, thereby shielding the catalyst from the reactants and causing rapid catalyst deactivation. The coke reaction is further promoted by the presence of sulfur-containing compounds which are known to promote coking at reaction temperatures and are generally present due to side reactions between the hydrocarbon and $SO_2$. Additionally, it is highly desirable in commercial applications to employ an inert diluent to reduce hydrocarbon losses to burning, coke, and heavy products. Preferentially, this inert diluent is steam in order to facilitate a relatively easy product recovery system. Unfortunately the catalysts reported in the prior art are severely deactivated in the presence of steam. By the process of this invention, however, the disadvantages of the prior art are greatly alleviated and catalyst life is markedly increased, thereby resulting in high yields of dehydrogenated product over long reaction periods.

SUMMARY OF THE INVENTION

In accordance with this invention, therefore, the vapor phase catalytic dehydrogenation of dehydrogenatable organic compounds is effected by contacting the dehydrogenatable compound with a sulfur oxide, in the presence of an inert diluent and a low surface area catalyst. Preferably, however, the surface area of the catalyst is within some critically defined ranges as will be hereinafter discussed. In another preferred embodiment of this invention, the catalyst life is markedly increased by utilizing, in minor amounts, a metal, salt, oxide, or hydroxide of alkali or alkaline earth metals in conjunction with the low surface area catalyst.

Generally, it is believed that the success of the process described herein is due in large part to the discovery that low surface area catalysts are selective in promoting the desired reaction and tend to minimize hydrocarbon burning and coke formation. The use of such catalysts is then a reversal from the general trend in catalysis, i.e., the use of high surface area catalysts, such as activated alumina, activated carbon, molecular sieves, etc. Since high surface area catalysts have been used successfully in exothermic reactions, it would seem reasonable to believe that they could be effectively utilized in endothermic reactions, too. Nevertheless, it has been found that high surface area catalysts are ineffective and that low surface area catalysts are essential to the practice of this invention. Thus, high surface area catalysts tend to increase (catalyze) the rate of burning reactions, e.g., $$C_nH_{2n+2}+(3n+1)2SO_2 \rightarrow NCO_2+(n+1)H_2O+(3n+1)2S \quad (2)$$

thereby encountering two major disadvantages. Firstly, since the burning reaction will require far more $SO_2$ per mole of dehydrogenatable organic compound than the desired dehydrogenation reaction, burning of only a small amount of hydrocarbon removes a large amount of $SO_2$ from the system and makes it unavailable for dehydrogenation. Secondly, since burning is an exothermic reaction, whereas dehydrogenation with $SO_2$ is endothermic, any amount of burning will tend to heat the catalyst bed resulting in either localized or generalized hot spot formation. The hot spots then will tend to increase the rate of burning and cracking reactions thereby causing catalyst fouling (due to coke formation) resulting in both a lowered yield of desired products and rapid catalyst deactivation.

As previously mentioned, it is essential to employ low surface area catalysts for the reaction described herein. This requirement is necessitated by the fact that the catalyst must be selectve to the desired reaction while inhibiting undesired side reactions such as cracking and/or burning. Various catalysts can be employed which satisfy the low surface area criterion, among which are those that are or could be employed as catalyst support materials. These catalysts can also be described as difficultly reducible oxides or refractory oxides and can be selected from the oxides of metals of Groups II–VIII of the Periodic Chart of the Elements, preferably of Groups II–A, III–A, IV–A, IV–B, V–B, VI–B and VII–B and most preferably Groups IV–B and III–A. Suitable examples of such materials are magnesia, barium oxide, thoria, alumina, boria, vanadia, chromia, titania, silica, silica-alumina, tungsten oxide, zirconia, hafnium oxide and the like. Of these, silica, alumina, vanadia, magnesia, and titania are more preferred, particularly alumina and titania. It will be recognized that these catalysts need not start out as oxides but may be converted to the oxides during the course of the reaction. For example, a nitrate or hydroxide salt is readily converted to its corresponding oxide at reaction temperatures.

Another class of catalysts applicable to this invention and highly preferred are those based on titanium and oxygen, i.e., titanates. These catalysts have shown exceptional stability and give good yields of the desired dehydrogenated products. Applicable titanates are those wherein any metal from Groups I–VIII of the Periodic Chart of the Elements is combined with titanium and oxygen. Typically active titanates are: lithium titanate, barium titanate, cerium titanate, nickel titanate, lead titanate, strontium titinate, and the like. It is noted that titanium metal, by itself, can also be employed successfully.

Additionally, such common support materials as silicon carbide; carbon, e.g., coke, graphite; diatomaceous earths, e.g., kieselguhr; clays, both natural and synthetic, e.g., attapulgite clays; magnesium silicates; phosphates, e.g., calcium nickel phosphate, aluminum phosphate; and the like which are of low surface area can also be employed, although somewhat less effectively than the other materials listed hereinabove.

Of course, all of the catalysts mentioned hereinabove are low surface area catalysts (as measured by nitrogen adsorption) and can be sucessfully employed in the dehydrogenation process. Nevertheless, it has also been found that a critical surface area range exists for many catalysts within which the yield of dehydrogenated product is markedly greater than would ordinarily be expected. Thus, for example, alumina catalysts have a critical surface area range starting above a threshold surface area of about 0.6 m.$^2$/gram where the yield of dehydrogenated product increases by about tenfold. While a critical upper limit where product yield falls off sharply does not exist as such, the increasing make of by-products and increased coking which accompany increasing surface area establishes a critical upper limit above which it becomes uneconomical to proceed with the reaction. Consequently, it is preferred that alumina catalysts have a surface area ranging from about 0.6 to 100 m.$^2$/gram, preferably about 0.6 to 50 m.$^2$/gram and more preferably about 0.6 to 30 m.$^2$/gram.

DRAWING DESCRIPTION

Turning now to the drawing which shows a log plot of surface area against mole percent conversion, selectivity, and yield of an ethylbenzene dehydrogenation over an alpha alumina catalyst. The top curve reflects the selectivity of the reaction to styrene while the middle and bottom curves represent ethylbenzene conversion and styrene yield, respectively. It will be noticed that the slope of each curve is rather small at low surface areas, but at above the threshold of about 0.6 m.$^2$/gram a sharp break in the curves occurs and the selectivity, conversion, and yield increase significantly, i.e., the slope of the curves rapidly increases toward unity, and reaches a maximum at about 1.8–2 m.$^2$/gram. After the sharp break in the curve, which denotes the critical surface area, the slope remains constant and selectivity, conversion, and yield fall off gradually. The data for these curves were obtained in an ethylbenzene dehydrogenation, the ethylbenzene/sulfur dioxide/helium mole ratio being 1/0.37/4, a temperature of 1175° F., and atmospheric pressure. Samples of product were taken at 4–5 hours from the start of each run.

The data shown in the drawing is to be contrasted with the disclosure of recently granted Japanese Pat. 23,652/65 wherein alpha alumina is shown to be an effective dehydrogenation catalyst for the sulfur dioxide promoted conversion of ethylbenzene to styrene. However, the alumina used therein, a Norton 101SA Alundum had a surface area of only 0.1 m.$^2$/gram. With such a low surface area material patentees had to use rather high sulfur dioxide levels, i.e., three and one-half times the amount used to develop the curves of the drawing, in order to obtain adequate styrene yields. Thus, the instant invention, wherein alpha alumina is shown to have a critical surface range, permits equally good and better yields than in this patent at much lower sulfur dioxide levels when the critical surface area threshold is surpassed. The advantages of discovering this critical surface area level, above which yields are markedly increased, are manifest. Perhaps most importantly, however, and aside from the increased product yield, is the rather low sulfur dioxide level that is employed. As previously mentioned, sulfur promoted reactions required high sulfur compound levels to obtain reasonable conversions and yields. In turn, high sulfur compound levels tended to increase catalyst coking and resulted in very short catalyst life spans. The low sulfur oxide levels which can be empolyed herein result in excellent conversions and long catalyst life spans.

The exact surface area levels for other catalysts which result in markedly increased product yields are not known with exactitude because of the many and varied catalysts which can be employed herein. Nevertheless, it is believed that one skilled in the art can readily determine these levels, particularly since the levels are thought to be rather similar to that determined for alumina, i.e., at least above about 0.5–1.0 m.$^2$/gram.

Now, it can be generally said that the higher the surface area, the more the coking and burning, the higher the quantity of sulfur oxide required for a given yield, and the lower the catalyst life. Taking these directions into consideration, surface areas that are readily usable in the process of this invention, regardless of catalyst material, should range from about 0.1 m.$^2$/gram to about 100 m.$^2$/gram, preferably 0.1 to 70 m.$^2$/gram, more preferably about 0.5 to 50 m.$^2$/gram, again keeping in mind minor variations, depending upon choice of catalyst.

The process of this invention can be applied to a great variety of dehydrogenatable organic compounds to obtain the unsaturated derivatives thereof. A suitable dehydrogentable compound can be any organic compound that contains at least one

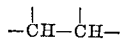

grouping, i.e., adjacent carbon atoms bonded to each other and each attached to at least one hydrogen atom. Preferably, such compounds have from 2 to about 20 carbon atoms. In addition to carbon and hydrogen, these compounds may also contain oxygen, halogens, nitrogen, and sulfur. Among the classes of organic compounds which can be dehydrogenated by this process are: alkanes, alkenes, alkyl halides, ethers, esters, aldehydes, ketones, organic acids, alkyl aromatic compounds, alkyl heterocyclics, cyanoalkanes, cyanoalkenes, and the like. Illustrative applications include: ethylbenzene to styrene, isopropyl benzene to α-methyl styrene, cyclohexane to benzene, vinyl cyclohexane or vinyl cyclohexene to styrene, ethane to ethylene, n-butane to butenes and butadiene, butene to butadiene, isobutane to isobutylene, methyl butene to isoprene, propionaldehyde to acrolein, ethyl chloride to vinyl chloride, propionitrile to acrylonitrile, methyl isobutyrate to methyl methacrylate, propionic acid to acrylic acid, ethyl pyridine to vinyl pyridine, and the like. Preferred dehydrogenatable feed stocks are the $C_2$–$C_{20}$ hydrocarbons, i.e., paraffins, alkyl benzenes, alkyl and alkenyl substituted cycloaliphatic comopunds, and monoolefins. Particularly preferred, however, are $C_2$–$C_9$ paraffins, $C_3$–$C_9$ monoolefins, $C_8$–$C_{16}$ alkyl benzenes, and $C_8$–$C_{16}$ alkyl and alkenyl substituted cycloaliphatic compounds, still more particularly $C_4$–$C_8$ monoolefins and paraffins, $C_8$–$C_{10}$ alkyl benzenes, and $C_8$–$C_{10}$ alkyl and alkenyl substituted cycloaliphatic compounds. Particularly, effective as feed stocks are the olefinic hydrocarbons or alkyl benzenes or vinyl substituted cycloaliphatics which may be dehydrogenated to provide a product wherein the major unsaturated product has the same number of carbon atoms as the feed hydocarbon. Ethylbenzene is a particularly preferred dehydrogenatable compound and its reaction with sulfur dioxide in accordance herewith results in ethylbenzene conversions in excess of 80%, preferably 85%, with selectivity to styrene in excess of 85%, preferably 90%, resulting in styrene yields in excess of 75%, preferably in excess of 80%.

In yet another embodiment, dehydrocyclization can also be effected. Thus, $C_6$–$C_8$ paraffins, e.g., hexane, heptane, octane, can be converted into $C_6$–$C_8$ aromatics, e.g., benzene, toluene, ethylbenzene, paraxylene.

The inert diluent which may be employed to reduce the partial pressure of the reactants may be any gas normally inert under the conditions of the reaction. Illustrative of the gases that may be employed are: helium, nitrogen, carbon monoxide, carbon dioxide, steam, etc., as well as methane, waste gases containing methane, and mixtures of the foregoing. Preferably, however, the diluent is steam or a mixture of diluents which is primarily steam, e.g., steam and helium, steam and nitrogen, steam and carbon dioxide, etc.

The molar ratio of inert diluent to dehydrogenatable compound is not critical and may vary over a wide range as long as at least about 1 mole of diluent per mole of dehydrogenatable compound is present. This value, however, is merely an arbitrary limit at which the yield of dehydrogenated product becomes practical and economical. Molar ratios below this value will also show increases in yield, generally the conversion and yield increasing with increased dilution of the sulfur oxide. The upper limit is not at all critical and larger amounts of diluent will only serve to further reduce the partial pressure of the reactants. Preferably, however, a molar ratio of 1 to 20, more preferably 1 to 8, of diluent to dehydrogenatable compound is employed. It will be obvious to one skilled in the art that this same result can be accomplished by operating under reduced pressures. However, use of an inert diluent is preferred, since it alleviates problems of vacuum equipment.

The conditions under which the reaction is effected are not generally critical and can be the conditions under which normal vapor phase catalytic dehydrogenation reactions are effected. Thus, reaction temperatures should be at least about 700° F., preferably 800° to 1500° F., and more preferably 900° to 1200° F. Similarly, pressures may vary widely and can range from subatmospheric, e.g., 0.1 atmosphere, ot superatmospheric, e.g., 50 atmospheres or higher. Preferably, however, pressures may range from about 1 to 3 atmospheres.

As has been previously stated herein, it has normally been the practice to utilize relatively large amounts of sulfur dioxide in dehydrogenation reactions. See, for example, U.S. Pat. 3,299,155 wherein the mole ratio of sulfur dioxide to hydrocarbon charge is maintained at from about 1:1 to about 2:1. As previously mentioned, such high levels of sulfur compound, however, tend to drastically reduce catalyst life by promoting the formation of coke. Now, in the present invention, a sulfur oxide is employed, i.e., $SO_2$ or $SO_3$ or $SO_2/SO_3$ mixtures or their water solutions $H_2SO_3$, $H_2SO_4$, but preferably $SO_2$, and Table I below shows the levels that can be satisfactorily employed herein:

TABLE I

| | Broad | Preferred | More preferred | Most preferred |
|---|---|---|---|---|
| Mol $SO_2$/mol $H_2$ abstracted | 0.01–1.0 | 0.2–1.0 | 0.2–0.7 | 0.2–0.5 |
| Mol $SO_3$/mol $H_2$ abstracted | 0.007–1.0 | 0.15–1.0 | 0.15–0.6 | 0.15–0.4 |

When water solutions of the sulfur oxide are employed the molar ratios are based on the amount of $SO_2$ or $SO_3$ present therein. It is noted that the term "mol of hydrogen to be abstracted" is used in conjunction with the sulfur level employed (dehydrogenation occurs by abstraction of hydrogen). Thus, for example, in the dehydrogenation of butane to butene one mole of hydrogen is abstracted but in the dehydrogenation of butane to butadiene two moles of hydrogen are abstracted. Therefore, the term is meaningful and directly related to the actual reaction. It is also noticed that the sulfur levels are quite low, relative to the prior art, thereby reducing coke formation tendencies and lengthening catalyst life.

The rate of feeding the dehydrogenatable compound over the catalyst bed, i.e., the space velocity, may vary rather widely, such as from 0.01 w./w./hr. (weight of feed/weight of catalyst/hour) to 10 w./w./hr., preferably 0.05 to 1 w./w./hr., more preferably 0.1 to 0.3 w./w./hr.

PREFERRED EMBODIMENT

In a preferred embodiment hereof, it has been found that a catalyst which incorporates a minor proportion of a metal or a metal salt, e.g., halides, phosphates, sulfates, etc., oxide, or hydroxide of an alkali or alkaline earth metal promotes an increase in the yield of dehydrogenated product as well as markedly increasing the life of the catalyst. Many of those salts, oxides, hydroxides or metals may change during the preparation of the catalyst, during heating in the reactor, prior to, or during the reaction, or are converted to another form under the reaction conditions, but such materials still function as effective catalysts in this process. For example, many metals, metal nitrates, nitrites, carbonates, hydroxides, acetates, sulfites, sulfides, and the like, may be readily converted to the corresponding oxide under the defined reaction conditions. Salts such as phosphates, silicates, and halides are stable at reaction conditions, and are also effective in increasing catalyst life. At any rate, the catalysts are effective, if the listed metals or their compounds are present in a catalytic amount in contact with reaction gases. Preferred are the oxides and chlorides of the listed metals, as well as the metals themselves. Of the alkali metals, i.e., lithium, sodium, potassium, rubidium, and cesium, it is preferred to utilize sodium or potassium as the metals or derivatives thereof, most preferably sodium. Of the alkaline earth metals, i.e., beryllium, magnesium, calcium, strontium, and barium, it is preferred to utilize calcium or barium as the metals or derivatives thereof, most preferably barium. It is also noted that palladium, e.g., palladium chloride, acts similarly as the alkali or alkaline earth metals with regard to increasing both yield and catalyst life. While, generally, all of the metaals will increase catalyst life, sodium and barium are particularly preferred since they are significantly effective in increasing yield in addition to increasing catalyst life. The amount of this added material is not generally critical and usually any amount will be helpful. Preferably, however, the added material will make up about 0.05 to 40 wt. percent of the catalyst, more preferably about 0.3 to 10 wt. percent.

In a typical reaction sequence involving this invention a feed charge containing ethylbenzene, sulfur dioxide, and steam is charged to a suitable reactor containing an alumina catalyst incorporating a minor proportion of sodium oxide. The charge is heated until it vaporizes and additional heat is added to the reactor to bring the charge to reaction temperatures. After the desired degree of conversion has been effected, the reaction product is removed and the effluent is quenched in a condenser to about 500° F. where any sulfur formed is liquefied and removed from the stream for burning to $SO_2$ and recycle. The main effluent is further quenched and any remaining $H_2S$ and $CO_2$ is vented off as gases and the $H_2S$ converted to sulfur and then to $SO_2$ for recycle. The crude styrene product is then separated from the water diluent, e.g., by phase separations, the water recycled and the crude styrene sent to a vacuum distillation tower for purification. Unreacted ethylbenzene is recycled and pure styrene recovered for use as a monomer, for example, for the production of polystyrene.

In the case where the dehydrogenation feed and product are gaseous, e.g., dehydrogenation of butene to butadiene, after quenching the reactor off-gas to remove water the gas containing hydrocarbon, hydrogen sulfide and carbon dioxide is passed through an absorber to remove the hydrocarbon. The hydrogen sulfide and carbon dioxide is treated as noted previously. The hydrocarbon is removed by stripping and is purified by conventional means, the unreacted portion being recycled to the reactor and the pure product recovered for further use.

Having now described this invention, the following examples will serve to further illustrate the process. However, no limitations are to be implied from these examples since various modifications and variations will be apparent to those skilled in the art.

EXAMPLE 1

Table II below shows the efficacy of various low surface area catalysts for the dehydrogenation of ethylbenzene to styrene with sulfur dioxide and helium diluent at 1150° F., 0.3 w./w./hr. and a ratio of 1 mole ethylbenzene to 6 moles helium. The data was obtained using a 1-inch diameter vycor reactor containng 50 cc. of catalyst at the desired temperature 1–2 hours after startup.

TABLE II.—CATALYSTS FOR DEHYDROGENATING ETHYLBENZENE USING $SO_2$

| Catalyst | Surface area, m.²/g. | $SO_2$/EB mole ratio | Conv., percent | Sel., percent | Yield, percent |
|---|---|---|---|---|---|
| $Al_2O_3$ | 3.9 | 0.33 | 80 | 95 | 76 |
| $AlPO_4$ | 5.7 | 0.33 | 78 | 90 | 71 |
| $SiO_2$ [1] | 0.9 | 0.33 | 87 | 86 | 75 |
| MgO | 110 | 0.33 | 84 | 93 | 78 |
| $CaSO_4$ | 6.3 | 0.33 | 70 | 90 | 63 |
| $FeSO_4$ | | 0.33 | 62 | 90 | 56 |
| $Ca_5Ni(PO_4)_6$ | 8 | 0.33 | 83 | 96 | 79 |
| Charcoal | | 0.37 | 46 | 93 | 43 |
| 57% $ZrO_2$+43% $HfO_2$ | 0.2 | 0.45 | 63 | 92 | 58 |
| $TiO_2$ | 8.7 | 0.45 | 92 | 86 | 85 |
| $V_2O_5$ | | 0.45 | 87 | 93 | 82 |

[1] Contains about 3.9% $Na_2O$ and 2.1% CaO.

This table clearly shows the high yields that can be obtained with various low surface area catalysts and at relatively low sulfur dioxide levels.

EXAMPLE 2

Table III below shows the effect of a variety of oxide and titanate catalysts on the dehydrogenation of ethylbenzene to styrene.

TABLE III

Space velocity=0.3 w./w./hr.
Temperature 1,000° F.
Mole ratio EB/$SO_2$/He=1/0.37/4

| Catalyst | EB conv. percemt | Styrene Sel. in mole percent | Yield in mole catalyst |
|---|---|---|---|
| $TiO_2$ (7 m.²/g.) | 80 | 95 | 76 |
|  | 82 | 96 | 79 |
| $Al_2O_3$ (3 m.²/g.) | 68 | 94 | 64 |
| $Ta_2O_5$ 4.5 m.²/g. | 84 | 96 | 80 |
| $La_2O_3$ (3 m.²/g.) | 77 | 94 | 72 |
| $V_2O_5$ (2.7 m.²/g.) | 74 | 95 | 70 |
| $Nb_2O_5$ (0.1 m.²/g.) | 49 | 96 | 47 |
| $CeO_2$ (1 m.²/g.) | 50 | 95 | 47 |
| $ZnO_2$ (1.5m.²/g.) | 53 | 93 | 49 |
| $MoO_3$ | 26 | 88 | 23 |
| 19 wt. percent CoO on $Al_2O_3$ (100 m.²/g. | 57 | 74 | 42 |
| $Al_2O_3$ with 5 wt. percent $V_2O_5$ and 5 wt. percent CoO (0.5 m.²/g.) | 41 | 96 | 39 |
| $MnO_2$ | 51 | 94 | 48 |
| Ti (metal) | 23 | 97 | 22 |
| $SrTiO_3$ (3 m.²/g.) | 77 | 95 | 73 |
| $PbTiO_3$ (2.8 m.²/g.) | 80 | 95 | 76 |
| $ZnTiO_3$ (1.5 m.²/g.) | 46 | 91 | 42 |
| $NiTiO_3$ (1.6 m.²/g.) | 16 | 96 | 15.5 |
| $CeTiO_3$ | 77 | 95 | 73 |
| $BaTiO_3$ (2 m.²/g.) | 78 | 95 | 73 |
| $Li_2TiO_3$ (0.5 m.²/g.) | 44 | 93 | 41 |
| $Ba(AlO_2)_5$ (2 m.²/g.) | 42 | 96 | 40 |

EXAMPLE 3

This example shows the effect using a primarily steam diluent, i.e., 3 moles steam plus 1 mole helium which is effectively all steam.

TABLE IV.—$SO_2$ DEHYDROGENATION OF ETHYLBENZENE IN PRESENCE OF A STEAM DILUENT

Temperature=1,175° F.
EB space velocity=0.3 w./w./hr.
EB/$SO_2$/dil.=1/0.52/4
$Al_2O_3$ catalyst (3.9 m².g.)

| Run time, hours | EB Conv. percent | Selectivity to styrene, mole percent | Styrene yield, mole percent |
|---|---|---|---|
| 1 | 94 | 88 | 83 |
| 6 | 84 | 89 | 75 |

After 6 hours' run time, when prior art catalysts have generally deactivated, only a slight decrease in ultimate yield was recorded. This is believed due to the combinattion of low sulfur dioxide level and low surface area catalyst.

EXAMPLE 4

This example shows the effect of $SO_2$ and diluent concentration, Tables V and VI respectively, on an ethylbenzene dehydrogenation with a helium diluent after 6 hours' run time.

TABLE V

Catalyst=99.5% $Al_2O_3$–0.5% $Na_2O$
Temperature=1,150° F.
EB space velocity=0.3 w./w./hr.
EB/He=1/6

| $SO_2$/EB | EB conv., percent | Sty. sel., percent | Sty. yield, percent |
|---|---|---|---|
| 0.33 | 75 | 95 | 71 |
| 0.37 | 86 | 93 | 80 |
| 0.43 | 94 | 93 | 87 |
| 0.60 | 95 | 89 | 85 |

This table shows that as $SO_2$ concentration is increased, conversion of the feed increases but selectivity to styrene decreases. Optimum yield of styrene comes at about 0.5 mole $SO_2$/mole EB.

TABLE VI

Catalyst=99.5% $Al_2O_3$–0.5% $Na_2O$
Temperature=1,150° F.
EB space velocity=0.3 w./w./hr.
EB/$SO_2$=1/0.37

| He/EB | EB conv., percent | Sty. sel., percent | Sty. yield, percent |
|---|---|---|---|
| 6 | 86 | 93 | 80 |
| 5 | 86 | 91 | 78 |
| 4 | 84 | 91 | 77 |
| 3 | 86 | 91 | 78 |
| 2 | 83 | 88 | 73 |
| 1 | 81 | 87 | 70 |

This table shows that helium diluent concentration can be lowered to 3 mole/mole EB without significant loss in styrene yield. While some loss in styrene yield does occur when less than 3 moles of diluent is used, the last line in the above table indicates that it is possible to eliminate the diluent completely when $SO_2$ is used to dehydrogenate ethylbenzene in particular and hydrocarbons in general.

EXAMPLE 5

This example shows the effect of temperature on ethylbenzene dehydrogenation with $SO_2$.

TABLE VII

Catalyst=99.5% $Al_2O_3$–0.5% $Na_2O$
EB space velocity=0.3 w./w./hr.
EB/$SO_2$/He=1/0.37/4–6

| Temp., ° F | EB conv., percent | Sty. sel., percent | Sty. yield, percent |
|---|---|---|---|
| 900 | 2 | 84 | 2 |
| 930 | 70 | 93 | 65 |
| 1,000 | 83 | 94 | 78 |
| 1,150 | 86 | 94 | 81 |
| 1,200 | 85 | 94 | 80 |
| 1,250 | 89 | 91 | 81 |

This table shows that as temperature is raised, conversion increases. At a temperature greater than about 930° F., the maximum selectivity is reached.

EXAMPLE 6

This example is similar to that in Example 4. Here conditions were the same except that the diluent was 3 moles $H_2O$ plus 1 mole He and the temperature was 1175° F.

TABLE VIII

Catalyst=99.5% $Al_2O_3$–0.5% $Na_2O$
Temperature=1,175° F.
EB space velocity=0.3 w./w./hr.
EB/He/$H_2O$=1/1/3
Results at 6 hours on oil

| $SO_2$/EB | EB conv., percent | Styrene sel., percent | Styrene yield, percent |
|---|---|---|---|
| 0.20 | 62 | 97 | 60 |
| 0.33 | 73 | 93 | 68 |
| 0.45 | 87 | 92 | 80 |
| 0.53 | 92 | 89 | 82 |
| 0.60 | 94 | 86 | 81 |

This table shows that as $SO_2$ is increased conversion increases but selectivity decreases. Optimum styrene yields occur at around 0.5 mole $SO_2$/mole EB. Similar results as in Example 4 were obtained but at a slightly increased temperature when a steam diluent is employed.

EXAMPLE 7

At conditions similar to that of Example 5 but a EB/$SO_2$/He of 1/0.45/1, the effect of increasing steam was studied.

TABLE IX

| $H_2O$/HC | EB conv., percent | Sty. sel., percent | Sty. yield, percent |
|---|---|---|---|
| 0 | 81 | 87 | 70 |
| 2 | 82 | 92 | 75 |
| 3 | 87 | 92 | 80 |
| 4 | 90 | 93 | 84 |
| 5 | 30 | 91 | 27 |

This table shows that as $H_2O$ concentration is increased, conversion, selectivity and yield are increased until a limiting $H_2O$ concentration is reached. At this point, $H_2O$ partial pressure is sufficiently high to poison the catalyst resulting in a sharp drop in ethylbenzene conversion and hence the styrene yield. It is believed that water is absorbed on the catalyst surface thereby masking the surface from the reactants. However, by increasing the temperature an $H_2O$ poisoned catalyst can be regenerated. For example, an $H_2O$/HC ratio of 5 at 1200° F. results in a 72% styrene yield and at 1250° F. a 78% styrene yield.

EXAMPLE 8

This example shows the effect of employing addition materials with the basic catalyst.

TABLE X

EB/$SO_2$/He=1/0.37/4
Temperature=1,000° F.
EB space velocity=0.3 w./w./hr.

| Catalyst base | Added metal [1] | EB conv., percent | Sel. to styrene, percent | Styrene yield, percent |
|---|---|---|---|---|
| Alumina (4 m.²/g.) | | 69 | 94 | 65 |
| | 0.3% Na | 79 | 93 | 73 |
| | 1.7% Ba | 77 | 93 | 71 |
| | 0.05% Pd [2] | 78 | 92 | 72 |
| Titania (8.7 m.²/g.) (calcined at 1,200° F.). | | 76 | 94 | 72 |
| | 0.3% Na | 89 | 95 | 84 |
| | 1.7% Ba | 92 | 95 | 87 |
| Alumina (3 m.²/g.) | | 83 | 94 | 78 |
| | 0.05% Pd [2] | 89 | 93 | 83 |

[1] As oxide.  [2] As chloride.

The added metal is shown to significantly increase conversion at a given selectivity and, therefore, ultimate product yield.

EXAMPLE 9

This example shows the effect on catalyst life of adding $Na_2O$ and Ba (as a soluble salt) to the catalyst in the $SO_2$ promoted dehydrogenation of ethylbenzene, in the presence of a steam diluent.

TABLE XI

Temperature=1,175° F.
EB space velocity=0.3 w./w./hr.
EB/He/$H_2O$/$SO_2$=1/1/3/0.52

| | Catalyst | | | |
|---|---|---|---|---|
| | 100% $Al_2O_3$ | | 99.5% $Al_2O_3$–0.5% $Na_2O$ | |
| Time on oil, hours | 1 | 6 | 1 | 6 |
| EB conv., percent | 94 | 81 | 91 | 99 |
| Sty. sel., percent | 90 | 92 | 87 | 86 |
| Sty. yield, percent | 85 | 75 | 79 | 81 |

The results clearly show the inhibiting effect of the $Na_2O$ on catalyst deactivation after a 6 hour run.

TABLE XII

Catalyst=99.5% $Al_2O_3$–0.5% $Na_2O$
Temperature=1175° F.
EB Space Velocity=0.3 w./w./hr.
EB Space Velocity=0.3 w./w./hr.
Results at 5–6 hours on oil.

| Added Ba wt. percent: | Styrene yield percent |
|---|---|
| 0 | 82 |
| 0.343 | 83.5 |
| 1.030 | 84.6 |
| 1.717 | 85.4 |
| 3.434 | 85.3 |

EXAMPLE 10

Tables XIII and XIV show the effect of $SO_2$ in promoting the dehydrogenation of ethylbenzene to styrene over a titania catalyst with 1.9 wt percent BaO or 2.2 wt. percent $PdCl_2$.

TABLE XIII.—THERMAL DEHYDROGENATION

Space velocity=0.3 w./w./hr.
EB/diluent=1/4
Temperature=1,000° F.

| | | Styrene | |
|---|---|---|---|
| Diluent | EB conv., percent | Sel. in mole percent | Yield in mole percent |
| $H_2O$ | 2.8 | 79 | 2.2 |
| He | 5.6 | 93 | 5.2 |

TABLE XIV.—$SO_2$ DEHYDROGENATION

Temperature=1,000° F.
Mole ratio EB/$SO_2$/He=1/0.37/4
Catalyst base=$TiO_2$ with S.A. 6.7 m.²/g.

| | | Styrene | |
|---|---|---|---|
| Promoter added | EB conv., percent | Sel. in mole percent | Yield in mole percent |
| None | 82 | 96 | 79 |
| 1.9 wt. percent BaO | 87 | 95 | 83 |
| 2.2 wt. percent $PdCl_2$ | 90 | 95 | 86 |
| 1.9 wt. percent BaO and 2.2 wt. percent $PdCl_2$ | 85 | 96 | 82 |

Obviously, yields are tremendously increased with $SO_2$ present and can be further increased by using small amounts of Ba or Pd additives in the catalyst.

EXAMPLE 11

The table below shows the effect of adding materials to the catalyst to improve yield and catalyst life for the conversion of ethylbenzene to styrene with $SO_2$.

TABLE XV

Space velocity=0.3 w./w./hr.
Temperature=1,000° F.
Mole ratio $EB/SO_2/He$=1/0.37/4

| Catalyst | EB conv., percent | Styrene Sel. in mole percent | Styrene Yield in mole percent |
|---|---|---|---|
| $TiO_2$ (~9 m.²/g.) | 80 | 95 | 76 |
| $TiO_2$ with 0.5 wt. percent NaOH | 89 | 95 | 84 |
| $TiO_2$ with 1.9 wt. percent BaO | 92 | 95 | 87 |
| $TiO_2$ with 2.2 wt. percent $PdCl_2$ | 86 | 93 | 80 |
| $TiO_2$ with 2.2 wt. percent $PdCl_2$ and 1.9 wt. percent BaO | 91 | 95 | 86 |
| $Al_2O_3$ (~3 m.²/g.) | 68 | 94 | 64 |
| $Al_2O_3$ with 0.5 wt. percent $Na_2O$ | 79 | 93 | 73 |
| $Al_2O_3$ with 0.5 wt. percent $PdCl_2$ | 78 | 92 | 72 |
| $Al_2O_3$ with 1.9 wt. percent BaO | 77 | 93 | 71 |
| $Al_2O_3$ containing 0.5 wt. percent $Na_2O$ (~3 m.²/g.) | 82 | 94 | 77 |
| $Ta_2O_5$ | 84 | 96 | 80 |
| $Ta_2O_5$ with 1.9 wt. percent BaO | 84 | 96 | 80 |

EXAMPLE 12

This example shows the effect of changing from a helium to a water diluent with a titania catalyst for the dehydrogenation of ethylbenzene to styrene with $SO_2$.

TABLE XVI

Catalyst=$TiO_2$+1.9 wt. percent BaO
Space velocity=0.3 w./w./hr.
Temperature=1,000° F.
Mole ratio $EB/SO_2$/diluent=1/0.37/4

| Diluent | EB conv., percent | Styrene Sel. in mole percent | Styrene Yield in mole percent |
|---|---|---|---|
| $H_2O$ | 86 | 95 | 82 |
| He | 92 | 95 | 87 |

EXAMPLE 14

This example shows that n-hexane can be readily dehydrocyclized to benzene using $SO_2$ and a low surface area alumina catalyst.

TABLE XVII

Catalyst=~5 m.²/g. $Al_2O_3$
n-Hexane space velocity=0.2 w./w./hr.
Mole ratio n-hexane/$SO_2$/helium=1/1/3

| Temperature, °F.: | n-Hexane conv., percent | Benzene Sel. in mole percent | Benzene Yield in mole percent |
|---|---|---|---|
| 880 | 19 | 56 | 10 |
| 950 | 46 | 63 | 29 |
| 1,050 | 90 | 70 | 63 |
| 1,100 | 96 | 67 | 64 |

EXAMPLE 15

This example shows the critical threshold surface area level for titania catalysts. The results were obtained at 1075° F. an EB space velocity of 0.6 w./w./hr., atmospheric pressure and an $EB/SO_2/H_2O$ mole ratio of 1/0.37/4.

TABLE XVIII

| Catalyst surface area (m.²/gm.) | EB conv., percent | Styrene sel., mole percent | Styrene yield, mole percent |
|---|---|---|---|
| 10.5 | 83 | 98 | 74 |
| 9.5 | 85 | 91 | 78 |
| 8.5 | 80 | 91 | 73 |
| 6.9 | 75 | 92 | 69 |
| 3.7 | 54 | 86 | 48 |
| 1.4 | 13 | 24 | 3 |

This data clearly shows that a critical titania surface area level exists at surface areas above about 1.4 m.²/gm.

What is claimed is:

1. A process for the dehydrogenation of dehydrogenatable organic compounds which comprises reacting in the vapor phase a feed mixture consisting essentially of a dehydrogenatable organic compound, a sulfur oxide and an inert diluent at a temperature above about 700° F., the reaction being effected in the presence of a low surface area catalyst having a surface area ranging from about 0.5 m.²/gram to about 100 m.²/gram.

2. The process of claim 1 wherein an inert diluent is employed in an amount of at least about one mole of inert diluent per mole of dehydrogenatable organic compound.

3. The process of claim 1 wherein the low surface area catalyst contains a metal selected from the group consisting of Group II–A, III–A, IV–A, IV–B, V–B, VI–B, VII–B metals and mixtures thereof.

4. The process of claim 3 wherein the catalyst is a metal oxide, salt or oxide mixture.

5. The process of claim 3 wherein the catalyst contains a minor amount of a member selected from the group consisting of metals, salts, oxides and hydroxides of alkali metals and alkaline earth metals.

6. A process for the dehydrogenation of dehydrogenatable organic compounds which comprises reacting, in the vapor phase, a feed mixture consisting essentially of a dehydrogenatable organic compound having at least one $$-\overset{|}{C}H-\overset{|}{C}H-$$

grouping, a sulfur oxide, and an inert diluent, the molar ratio of diluent to dehydrogenatable organic compound being at least about 1/1 at a temperature in the range of from about 800° to about 1500° F., the reaction being effected in the presence of a low surface area catalyst selected from the group consisting of metals and oxides of metals of Groups II–A, III–A, IV–A, IV–B, V–B, VI–B, VII–B and mixtures thereof, the catalyst having a surface area ranging from about 0.5 m.²/g. to about 100 m.²/g.

7. The process of claim 6 wherein the dehydrogenatable organic compound is a $C_2$–$C_{20}$ hydrocarbon.

8. The process of claim 6 wherein the catalyst contains titanium.

9. The process of claim 6 wherein the catalyst is a titanate of a metal selected from the group consisting of Group I–VIII metals.

10. The process of claim 6 wherein the catalyst is alumina having a surface area above about 0.6 m.²/g.

11. The process of claim 6 wherein the sulfur oxide is sulfur dioxide and is employed in an amount of about 0.01 to 1.0 mole per mole of hydrogen abstracted from the dehydrogenatable organic compound.

12. The process of claim 11 wherein the amount of sulfur dioxide employed is about 0.2 to 0.7 mole per mole of hydrogen abstracted from the dehydrogenatable organic compound.

13. The process of claim 6 wherein the sulfur oxide is sulfur trioxide and is employed in an amount of about 0.007 to 1.0 mole per mole of hydrogen abstracted from the dehydrogenatable organic compound.

14. The process of claim 6 wherein the catalyst contains a minor amount of a member selected from the group consisting of metals, salts, oxides, and hydroxides of alkali metals and alkaline earth metals.

15. A process for the dehydrogenation of dehydrogenatable organic compounds which comprises reacting, in the vapor phase, a feed mixture consisting essentially of a dehydrogenatable hydrocarbon having at least one $$-\overset{|}{C}H-\overset{|}{C}H-$$

grouping and selected from the group consisting of $C_4$–$C_8$ paraffins and monoolefins, $C_8$–$C_{10}$ alkyl benzenes, and $C_8$–$C_{10}$ alkyl and alkenyl substituted cycloaliphatics, sulfur dioxide, the mole ratio of sulfur dioxide to moles of hydrogen to be abstracted from the dehydrogenatable hydrocarbon being about 0.2 to about 0.7, and an inert diluent present in an amount of about 1 mole per mole of dehydrogenatable hydrocarbon at a temperature ranging from about 800° to 1500° F., the reaction being effected in the presence of a low surface area catalyst containing a member selected from the group consisting of oxides and metals of Group II-A, III-A, IV-A, IV-B, and V-B metals, the catalyst having a surface area ranging from about 0.5 to 100 m.²/gram.

16. The process of claim 15 wherein the catalyst also contains a minor amount of a member selected from the group consisting of metals, salts, oxides, and hydroxides of alkali metals and alkaline earth metals.

17. The process of claim 16 wherein the metal is barium.

18. The process of claim 16 wherein the metal is sodium.

19. The process of claim 15 wherein the dehydrogenatable hydrocarbon is ethylbenzene.

20. The process of claim 18 wherein the catalyst contains titanium.

21. The process of claim 18 wherein the catalyst is a titanate.

22. The process of claim 18 wherein the catalyst is alumina having a surface area above about 0.6 m.²/g.

23. The process of claim 18 wherein the catalyst is alumina of a surface area ranging from about 0.6 to 30 m.²/g.

24. The process of claim 12 wherein the dehydrogenatable organic compound is ethyl benzene.

25. The process of claim 24 wherein the low surface area catalyst is magnesia, the catalyst having a surface area in the range of from about 0.5 to about 50 m.²/gram.

26. The process of claim 25 wherein the reaction is conducted at a temperature in the range of from about 900° to about 1200° F.

References Cited

UNITED STATES PATENTS

| | | | |
|---|---|---|---|
| 2,418,374 | 4/1947 | Stone | 260—680 |
| 2,720,550 | 10/1955 | Danforth | 260—668 |
| 2,867,677 | 1/1959 | Murray | 260—683.3X |
| 3,299,155 | 1/1967 | Adams | 260—669 |
| 3,403,192 | 9/1968 | Vadekar et al. | 260—669X |

CURTIS R. DAVIS, Primary Examiner

U.S. Cl. X.R.

260—680E